United States Patent [19]

Klement et al.

[11] Patent Number: 4,889,401
[45] Date of Patent: Dec. 26, 1989

[54] BIREFRINGENT OPTICAL WAVEGUIDE STRUCTURE HAVING A STRIP WAVEGUIDE BURIED IN A CLADDING LAYER AND THE METHOD OF MANUFACTURING

[75] Inventors: Ekkehard Klement, Graefelfing; Hartmut Schneider, Munich; Holger Karstensen, Munich; Helmut Zrschizky, Munich, all of Fed. Rep. of Germany

[73] Assignee: Siemens Aktiengesellschaft, Berlin and Munich, Fed. Rep. of Germany

[21] Appl. No.: 219,579

[22] Filed: Jul. 15, 1988

[30] Foreign Application Priority Data

Sep. 25, 1987 [DE] Fed. Rep. of Germany ....... 3732407

[51] Int. Cl.⁴ .............................................. G02B 6/10
[52] U.S. Cl. ............................... 350/96.12; 350/96.33
[58] Field of Search ............... 350/96.11, 96.12, 96.13, 350/96.14, 96.30, 96.33

[56] References Cited

U.S. PATENT DOCUMENTS

| | | | |
|---|---|---|---|
| 4,179,189 | 12/1979 | Kaminow et al. | 350/96.33 |
| 4,400,052 | 8/1983 | Alferness et al. | 350/96.12 |
| 4,549,781 | 10/1985 | Bhagavatula et al. | 350/96.30 |
| 4,561,718 | 12/1985 | Nelson | 350/96.14 |
| 4,733,927 | 3/1988 | Jackson et al. | 350/96.12 |
| 4,756,734 | 7/1988 | Kersten et al. | 350/96.12 X |
| 4,798,434 | 1/1989 | Dammann et al. | 350/96.11 |

*Primary Examiner*—John D. Lee
*Attorney, Agent, or Firm*—Hill, Van Santen, Steadman & Simpson

[57] ABSTRACT

A birefringent optical waveguide structure comprises at least one or more strip waveguides of a first material embedded in a cladding layer of a second glass with at least one additional layer being applied on the cladding layer. The strip waveguides have a refractive index which is higher than the refractive index of the second glass of the cladding layers and the additional layer applies a mechanical stress to the strip waveguides which has a component extending perpendicular to the strip waveguides. Preferably, the mechanical stress is formed by the material of the additional layers having a different thermal expansion coefficient and a different elasto-optical coefficient than the materials forming the cladding layer and the strip waveguides. The method of forming the device includes rapidly cooling the structure from an elevated temperature to room temperature to create the mechanical stresses.

14 Claims, 1 Drawing Sheet

BIREFRINGENT OPTICAL WAVEGUIDE STRUCTURE HAVING A STRIP WAVEGUIDE BURIED IN A CLADDING LAYER AND THE METHOD OF MANUFACTURING

BACKGROUND OF THE INVENTION

The present invention is directed to a birefringent optical waveguide structure which is buried in a cladding layer of a second glass and to a method for manufacturing the waveguide structure.

Passive optical components that split the signal into orthogonally polarized parts are needed for coherent optical heterodyne reception independently of the polarization of the incoming signal. Such components can be executed with the means of integrated optics when adequately birefringent, integrated optical waveguides or structures of such waveguides can be manufactured with which the division of arbitrarily polarized light into two mutually orthogonally polarized components can be carried out.

SUMMARY OF THE INVENTION

It is an object of the present invention to provide a birefringent optical waveguide structure comprising at least one strip waveguide buried in a cladding layer of glass, which can be manufactured with adequately high birefringence so that the division for arbitrarily polarized light into mutual orthogonal components is attainable or enabled.

To accomplish this object, the invention is directed to a birefringent optical waveguide structure comprising at least one strip waveguide of a first glass or material being buried in a cladding layer of a second glass or material and at least one additional layer being provided on the cladding layer, said first glass having a refractive index higher than the refractive index of the second glass and the additional layer applying a mechanical stress to each strip waveguide with a component of the stress extending perpendicular to said strip waveguide. Preferably, the additional layer is a glass layer and is applied, preferably, on both surfaces or sides of the cladding layer. The glass of the additional layer has a different coefficient of thermal expansion and a different elasto-optical coefficient in comparison to the coefficient of thermal expansion and elasto-optical coefficient of the first and second glasses.

The method of producing such a birefringent optical waveguide structure comprises providing a substrate having a cladding glass layer of a second glass with a strip waveguide of the first glass being embedded in the cladding layer and at least one additional layer on the cladding layer to form a structure, then heating the structure to an elevated temperature and subsequently rapidly cooling the structure from the elevated temperature to a relatively low temperature to create thermal stresses between the cladding layer and the additional layer. The step of providing the substrate containing the cladding glass layer with the waveguide structure buried therein can be obtained by providing the cladding glasslayer on the substrate and embedding the waveguide in the cladding glass by field-induced ion exchange, by diffusion or by ion implantation. It is also possible to produce the buried strip waveguide structure in the cladding glass by providing a layer of the cladding glass, providing a layer of the first glass forming the strip waveguide, processing, such as be etching, the layer of the first glass to form the waveguide structure, then coating this structure with a layer of the second glass forming the cladding glass. Preferably, the step of providing the structure includes providing a substrate, providing an additional layer directly on the substrate, applying the cladding layer, forming the waveguide structure, either directly in the cladding layer or on the cladding layer and covering it with a second cladding glass layer, then applying an outer or second additional layer. The applying of the glass layers, for both the additional layer and cladding glass, as well as the layer for forming the structure, can be depositing from a vapor phase or by depositing by sputtering, it also can be formed by depositing in accordance to a CVD method.

Known structures of integrated optics, such as, for example, branchings, optical directional couplers, cascades of optical directional couplers, waveguide crossings and combinations of these elements can be manufactured with the waveguide of the invention and with the method of the invention. The invention is based on the fact that an adequate birefringence in glass can be produced by mechanical stresses which arise, for example, when glasses connected to one another and having different coefficients of thermal expansion and elasto-optical coefficients, particularly glasses that have different compositions, are cooled down in common from a high temperature.

Other advantages and features of the invention will be readily apparent from the following description of the preferred embodiments, the drawings and claims.

DESCRIPTION OF THE PREFERRED EMBODIMENTS

Figure 1:
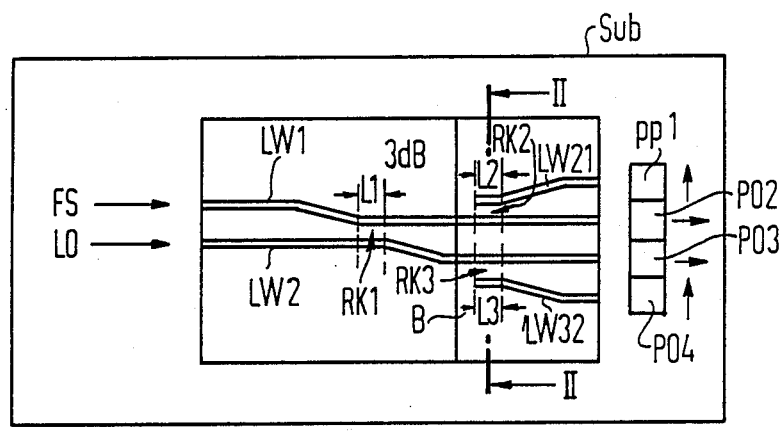
FIG. 1 is a plan view of a waveguide structure in the form of a cascade optical directional coupler on a substrate.

The principles of the present invention are particularly useful when incorporated in the waveguide structure of FIG. 1, which comprises a cascade of optical directional couplers RK1, RK2 and RK3 with the coupler RK1 being a traditional 3dB coupler for both intrinsic modes conducted in, respectively, one of two waveguides LW1 and LW2. The couplers RK2 and RK3 are polarization-sensitive couplers that enable the complete separation of two intrinsic modes supplied in the respective waveguides LW1 and LW2 and orthogonal relative to one another. Thus, one intrinsic mode is conducted to the photodiode PO2 and PO3 in the waveguide LW1 or, respectively, LW2, whereas the intrinsic mode orthogonal thereto and separated therefrom in the directional coupler RK2 will be conducted by the light waveguide LW21 to a photodiode pp1 and the mode separated by the directional coupler RK3 will be conducted in the light waveguide LW32 to a photodiode PO4.

The structure of FIG. 1 is suitable for an optical diversity receiver, whereby the elliptically polarized, optical signal FS conducted to the receiver and, for eaxmple, a transmission fiber, is coupled into one of the waveguides LW1 or LW2 and a linearly polarized optical signal LO or a local oscillator of the receiver is coupled into the other waveguide LW2 or, respectively, LW1.

The optical directional couplers RK1, RK2 and RK3 are formed in a knownmanner in that the two waveguides LW1 and LW2, and LW1 and LW21, or LW2 and LW32 are conducted in such a close proximity next to one another in a respective coupling path, such as L1, L2 or L3, that the overall coupling of light between them occurs. However, these waveguides are conducted at such a great distance from one another side-by-side outside of the coupling path L1, L2 and L3 that no such overcoupling will occur.

As already mentioned, the directional coupler RK2 and RK3 differ from the directional coupler RK1 in that they are polarization sensitive and separate the two supplied intrinsic modes polarized orthogonally relative to one another from one another. To that end, the two waveguides LW1 and LW21 for the coupler RK2 and the waveguides LW2 and LW32 for the coupler RK3 are composed of highly birefringent strip waveguides in the region of these directional couplers RK2 and RK3. For example, they are highly birefringent at least in their coupling path L2 or, respectively, L3.

Figure 2:
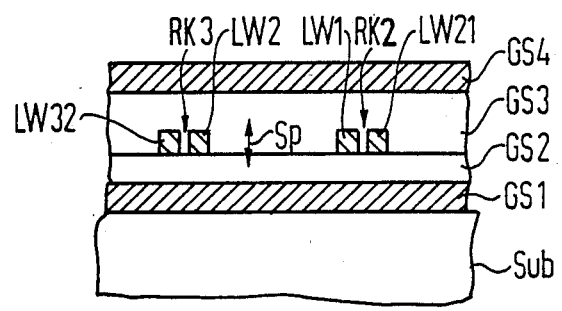
FIG. 2 is a cross sectional view taken along the lines II—II of FIG. 1.

An example for the manufacture of such a birefringent strip waveguide is set forth with reference to FIGS. 1 and 2. As illustrated in FIG. 2, a glass layer GS1 that has a different coefficient of thermal expansion and a different elasto-optical coefficient from the jacket glass of the waveguide which has a predetermined index of refraction is deposited on a substrate Sub in the region B of FIG. 1. The directional couplers RK2 and RK3, but not the directional coupler RK1, are situated in this region B. A glass layer GS2, which is a cladding layer of cladding or jacket glass, is deposited on this first-mentioned layer GS1. To form the strip waveguide, such as LW32, LW2, LW1 and LW21, a glass layer having a refractive index that is higher than the refractive index of the jacket glass of the layer GS2 is placed on the layer GS2. This newly applied glass layer will have the same coefficient of thermal expansion and the same elasto-optical coefficient as the jacket glass insofar as possible.

This glass layer is then etched off with the assistance of known etching and masking techniques, so that only the waveguides LW1, LW2, LW21 and LW32 remain on the jacket glass layer GS2 as elevated strips. The jacket glass layer GS2 and the waveguides LW1, LW2, LW21 and LW32 situated thereon are then covered with a second cladding layer GS3 of the jacket or cladding glass. An additional glass layer GS4 that, again, has a coefficient of thermal expansion and elasto-optical coefficient different from the jacket glass is deposited on the cladding layer GS3. This will form a unit or waveguide structure. After the application of all the layers, the structure of the layers are heated to a high temperature and are then quickly cooled in common to a relatively low temperature. Due to the different coefficients of thermal expansion, mechanical stresses having at least a component Sp extending perpendicular to the waveguides LW1, LW2, LW21 and LW32 will be formed.

Instead of manufacturing the waveguides by depositing a glass layer on a jacket or cladding glass layer, etching the layer to form the waveguide strips and then coating with a second layer of the cladding glass, the waveguides can be formed by providing one or more layers of the cladding glass and then forming or burying the waveguides in this cladding glass by a field-induced ion exchange or by a diffusion process or an ion implantation. All of these processes are known techniques.

The depositing of the glass layers can occur from a vapor chase, for example, by a CVD method or can also occur by means of sputtering the glass layers.

In a specific exemplary embodiment, the substrate Sub is composed of silicon. The additional layers GS1 and GS4 are composed of an $SiO_2$ that is doped with $Al_2O_3$. The cladding or jacket layers GS2 and GS3 is composed of $SiO_2$ and the waveguides LW1, LW2, LW21 and LW32 are composed of $SiO_2$ that has been doped with either $GeO_2$ or $TiO_2$. These glass layers are heated to 700° C. and are then quickly cooled to room temperature. A mechanical stress having a component Sp perpendicular to the waveguides LW1, LW2, LW21 and LW32 will occur and a relative difference of $\alpha\beta/\beta$ in the propagation constant having a value of about $10^{-4}$ will occur for the intrinsic modes conducted in the waveguides and polarized orthogonally relative to one another.

Although various minor modifications may be suggested by those versed in the art, it should be understood that we wish to embody within the scope of the patent granted hereon all such modifications as reasonalby and properly come within the scope of our contribution to the art.

We claim:

1. A birefringent optical waveguide structure comprising at least one strip waveguide of a first material being buried in a cladding layer of a second material, each strip waveguide having a longitudinal axis, said cladding layer with the strip waveguide being positioned between two additional layers, said first material having an index of refraction higher than the index of refraction of the second material and both of the additional layers applying a mechanical stress on the cladding layer and on each strip waveguide with a component of the stress extending perpendicular to the longitudinal axis of the waveguide.

2. A birefringent optical waveguide structure according to claim 1, comprising at least two strip waveguides.

3. A birefringent optical waveguide structure according to claim 1, wherein the first material and the second material are glass and each of the two additional layers are of a glass having a different coefficient of thermal expansion and different elasto-optical coefficient in comparison to the glass of the first material and second material.

4. A birefringent optical waveguide structure comprising at least one strip waveguide of a first material being buried in a cladding layer of a second material and at least one additional layer being provided on the cladding layer, each strip waveguide having a longitudinal axis, said first material having an index of refraction higher than the index of refraction of the second material and the additional layer applying a mechanical stress on each strip waveguide with a component of the stress extending perpendicular to the longitudinal axis of the waveguide, the first material and the second material being glass materials, the material of the additional layer being a glass material having a different coefficient of thermal expansion and a different elasto-optical coefficient in comparison to the glass materials of the strip waveguide and cladding layer.

5. A birefringent optical waveguide structure according to claim 4, comprising at least two strip waveguides.

6. A method of forming a birefringent optical waveguide structure having at least one strip waveguide of a first material buried in a cladding layer of a second material and at least one additional layer being provided on the cladding layer, each strip waveguide having a longitudinal axis, said first material having a refractive index higher than the refractive index of the second material and said additional layer applying a mechanical stress to each strip waveguide with a component of the stress extending perpendicular to the longitudinal axis of the waveguide, said method comprising the steps of providing a substrate with a cladding layer having at least one strip waveguide embedded therein and having an additional layer on the cladding layer to form a structure, heating the structure to a relatively high elevated temperature and then subjecting the structure to a rapid cooling to room temperature.

7. A method according to claim 6, wherein the step of providing the structure having at least one strip waveguide embedded in a cladding layer includes providing the cladding layer and embedding the strip waveguide by a field-induced ion exchange.

8. A method according to claim 6, wherein the step of providing the structure having a cladding layer with a strip waveguide embedded therein includes providing a cladding layer and then diffusing the strip waveguide into the cladding layer.

9. A method according to claim 6, wherein the step of providing the structure having the cladding layer with the strip waveguide embedded therein includes providing the cladding layer and ion implanting the strip waveguide in the cladding layer.

10. A method according to claim 6, wherein the step of providing the structure having the cladding layer with at least one embedded strip waveguide and having an additional layer comprises providing a substrate, providing an additional layer on said substrate, providing a first cladding layer on said additional layer, providing a layer of first material for forming the strip waveguide, forming the strip waveguide from said layer of first material, and applying a second cladding layer to cover the strip waveguide.

11. A method according to claim 10, wherein the step of applying the layers applies the layers by sputtering.

12. A method according to claim 10, wherein the method of applying the layers on the substrate applies the layers by vapor depositing from a vapor phase.

13. A method according to claim 12, wherein the step of vapor depositing the layers deposits glass layers by a CVD method.

14. A method according to claim 10, which includes, after applying the second cladding layer, applying a second additional layer so that the two cladding layers and the strip waveguide are sandwiched between two additional layers.

* * * * *